UNITED STATES PATENT OFFICE.

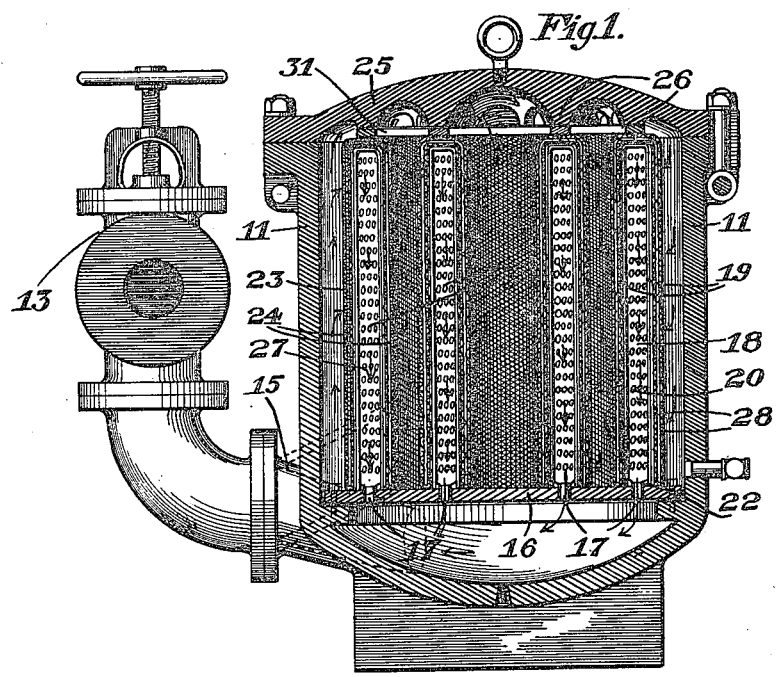
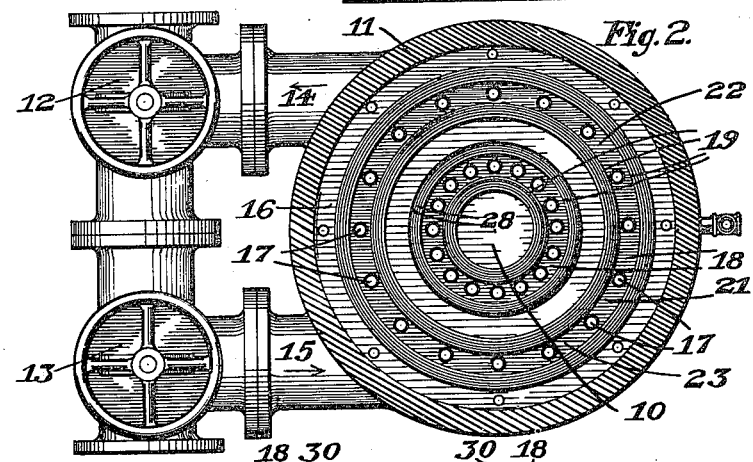
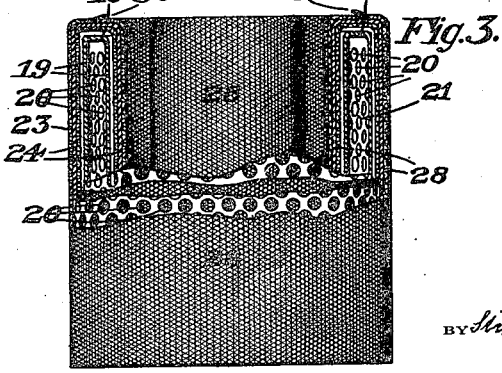

CARL F. BRAUN, OF SAN FRANCISCO, CALIFORNIA.

FILTER AND GREASE-EXTRACTOR.

1,179,157.  Specification of Letters Patent.  Patented Apr. 11, 1916.

Application filed July 6, 1915. Serial No. 38,293.

*To all whom it may concern:*

Be it known that I, CARL F. BRAUN, a citizen of the United States, residing in the city and county of San Francisco and State of California, have invented new and useful Improvements in Filters and Grease-Extractors, of which the following is a specification.

This invention relates to a filter and grease extractor.

My invention, therefore, has for its object to simplify and improve the construction and operation of filtering and grease extracting devices of the nature indicated and contemplates the use of double-walled shells or cylinders, whereby the filtering area of a single cartridge is practically doubled, and by reason of which duplication of cartridges can be effected without wasting the available space in the filtering chamber.

One form which my invention may assume is exemplified in the following description and illustrated in the accompanying drawings, in which—

Figure 1 shows a vertical, central, sectional view of a device embodying my invention. Fig. 2 shows a horizontal sectional view of the same. Fig. 3 shows a view of a cartridge, with certain parts broken away for the sake of clearness.

Referring in detail to the device illustrated in the accompanying drawings, it will be seen that it comprises a filtering chamber 10, formed by a casing 11, usually cylindrical in form, though not necessarily so. This casing is provided with an inlet valve 12 and an outlet valve 13, the former in communication with the filtering chamber through a pipe 14 in the side of the casing, and the latter communicating through a pipe 15 with the bottom of the casing separated from the chamber by a detachable false bottom 16. The false bottom is provided with circumferentially arranged openings 17 with which the inner shell of the cartridge coöperates.

Each cartridge comprises an inner shell or cylinder 18 constructed of two spaced walls 19, provided with perforations 20 and forming an annular channel 21, fitted into the bottom end of which is a ring 22 perforated to register with the perforations 17 and stationarily held upon the false bottom. The outer shell or cylinder 23 is provided with double-spaced walls 24, closed at their upper ends and adapted to fit over the walls of the inner shell and engage tightly at their lower ends with the bottom plate 16 to thereby exclude water. A removable cover 25 is carried on the casing 11 and serves, by means of downwardly projecting lugs 26 engaging with the upper end of the outer shell, to hold the latter in position within the chamber closely engaged at its lower end with the false bottom. The outer shell, as in the case of the inner shell, has its side walls provided with perforations 27. Prior to placing the outer shell in position, it is fitted with a stocking 28 of filtering media, such as linen terry, and so shaped as to cover all sides of the double walls. When, therefore, the outer shell is telescopically fitted over the inner shell, the stocking encompasses the outer wall of the outer shell and lies also between adjacent walls of the inner and outer shells. In appearance the stocking is that of an annular bag, having double separated walls. The free ends 30 of the stocking are brought together over the closed end of the outer shell and when in position are held folded thereon by means of a ring 31 carried by the lugs 26.

In the operation of the device, water admitted through the pipe 14 fills the chamber to a height above the walls of the cartridge, passing through the spaces between the lugs 26 and into the chamber 32 formed by the inner walls of the outer shell. To gain admission to the outlet pipe 15 the water is compelled to pass through the two layers of filtering media separating the chamber 32 and the space surrounding the outer cylinder from the chambers 33 formed by the double walls of the shells. As a consequence a double filtration of the water is effected. It will be noted that the double-walled construction of the shells and the formation of the chamber 32 by the outer shell provides filtering area of increased extent; the water passing in opposite directions into the annular chamber 32, thence through the perforations 17 at the bottom thereof and out through the pipe 15.

As shown, the number of cartridges may be increased by making the inner shell of the additional one encompass the outer shell of the one already in place, thereby preserving an even spacing throughout the filtering chamber and utilizing to the greatest extent all available room. The outer shell is quickly removable when the cover 25 is not in place and cleaning of the device is thereby facilitated. The stocking extending around the lower ends of the outer shell aids in forming a water-tight joint to prevent passage of water between the false bottom and said ends.

While I have shown and described but one form of my device herewith, it will be understood, nevertheless, that the same is susceptible of modification, and, therefore, many changes may be resorted to in the construction and arrangement of the several parts, and particularly in the shape of the shells, without departing from the spirit of my invention as disclosed in the appended claims.

Having thus described my invention, what I claim and desire to secure by Letters Patent is—

1. In a filter, a casing having a false bottom provided with annular series of openings, inner and outer cartridges, each composed of telescopic inner and outer shells each shell having two spaced concentric perforated walls which walls are connected at their tops and have open bottoms, perforated rings fitted into said open bottoms and having their perforations registering with the false bottom openings, each outer shell being lined with a stocking the latter extending over the exterior of the outer shell and having its ends folded and disposed over the tops of the outer shells, a cover on the casing having spaced lugs which overlie the tops of the shells, and rings seated on the folded stocking ends and engaged by said lugs.

2. In a filter, a cartridge composed of telescopic inner and outer shells, each shell having two concentric spaced perforated walls connected at their tops, and a stocking lining the interior of the outer shell and extending over the exterior of said outer shell and having its ends folded over on top of said outer shell.

3. In a filter, a casing having a false bottom provided with annular series of openings, inner and outer cartridges each composed of telescopic inner and outer shells each shell having two spaced concentric perforated walls which walls are connected at their tops and have open bottoms, which register with the false bottom openings, each outer shell being lined with a stocking the latter extending exteriorly of the outer shell and having its ends folded on top of the outer shell, and a cover having spaced lugs which latter overlie the folded stocking ends and serve to retain the latter in position.

4. In a filter, a casing, an inner and an outer cartridge therein, and a cover for the casing having inner and outer rows of spaced depending lugs which engage over the tops of respective cartridges.

5. In a filter, a casing, inner and outer cartridges in the casing, stockings connected to the cartridges and having ends folded on top thereof, and a cover having means associated therewith for engagement with the folded ends of the stockings to hold the latter against the cartridge tops.

6. In a filter, a casing, inner and outer cartridges in the casing, stockings connected to the cartridges and having ends folded on top thereof, and a cover having two series of spaced lugs for disposition over the respective cartridges and having rings which are engaged by the lugs and which seat on the folded stocking ends to hold the latter against the cartridge tops.

In testimony whereof I have hereunto set my hand in the presence of two subscribing witnesses.

CARL F. BRAUN.

Witnesses:
W. W. HEALEY,
M. E. EWING.